United States Patent
Park

(10) Patent No.: US 6,949,727 B2
(45) Date of Patent: Sep. 27, 2005

(54) CARBON HEATING APPARATUS UTILIZING A GRAPHITE FELT AND METHOD OF MANUFACTURING THEREOF

(75) Inventor: Jong-Yun Park, Incheon (KR)

(73) Assignee: Star Electronics Co., LTD., Incheon (KR)

( * ) Notice: Subject to any disclaimer, the term of this patent is extended or adjusted under 35 U.S.C. 154(b) by 0 days.

(21) Appl. No.: 10/674,497

(22) Filed: Oct. 1, 2003

(65) Prior Publication Data

US 2004/0211772 A1 Oct. 28, 2004

(30) Foreign Application Priority Data

Apr. 23, 2003 (KR) ................................ 10-2003-0025862

(51) Int. Cl.[7] .................................................. H05B 3/10
(52) U.S. Cl. ........................ 219/548; 219/541; 219/544; 29/611
(58) Field of Search ................................ 219/541, 544, 219/548; 392/407; 29/611; 313/637, 623, 412, 25

(56) References Cited

U.S. PATENT DOCUMENTS

| | | | | |
|---|---|---|---|---|
| 6,005,338 A | * | 12/1999 | Omae et al. | 313/412 |
| 6,180,497 B1 | * | 1/2001 | Sato et al. | 438/458 |
| 6,204,488 B1 | * | 3/2001 | Toya et al. | 219/541 |
| 6,584,279 B2 | * | 6/2003 | Seko et al. | 392/407 |
| 6,591,062 B2 | * | 7/2003 | Scherzer et al. | 392/407 |
| 6,611,102 B2 | * | 8/2003 | Kimoto et al. | 313/637 |
| 6,654,549 B1 | * | 11/2003 | Konishi | 392/407 |
| 2001/0050535 A1 | * | 12/2001 | Tagawa | 313/623 |
| 2002/0096984 A1 | * | 7/2002 | Konishi et al. | 313/25 |

* cited by examiner

Primary Examiner—Robin O. Evans
Assistant Examiner—Leonid Fastovsky
(74) Attorney, Agent, or Firm—G W i P S

(57) ABSTRACT

A carbon heating apparatus utilizing a graphite felt and a method of manufacturing thereof are presented comprising: a carbon heater made of a carbon fiber cut having a preset length and width, being performed heat treatment in a hydrogen gas atmosphere, a pair of terminal parts having a flat portion (31) at one end for connecting to outside power supply lines and clamping brackets (32) with protrusions (33) at opposite end for securely attaching to the carbon heater, and a quartz glass tube (10) with melt-jointing potions (15) for sealing both ends of the carbon heater. The manufacturing method comprises the steps: forming a carbon heater by cutting carbon fiber in a preset size, heat-treating in a hydrogen gas under a high temperature and vacuum to have uniform cutting surface, inserting the heat-treated carbon heater into a quartz glass tube and injecting the hydrogen gas, baking at a high temperature to remove impurities, primary aging and secondary aging the carbon heater and sealing both ends of the quartz glass tube.

15 Claims, 7 Drawing Sheets

CARBON HEATING APPARATUS UTILIZING A GRAPHITE FELT AND METHOD OF MANUFACTURING THEREOF

BACKGROUND OF THE INVENTION

1. Field of the Invention

The present invention relates to a carbon heating apparatus utilizing a graphite felt and a manufacturing method thereof. More particularlly, the carbon heating apparatus comprises a carbon heater made of a carbon fiber forming with a predetermined section and length and heat treated in a hydrogen gas atmosphere under a preset high temperature to make uniform surface cut structure, a quartz glass tube for enveloping and sealing the carbon heater, and a pair of termials for securely attaching both ends of the carbon heater to prevent unwanted sparks and looening the carbon heater.

2. Description of the Related Prior Art

Generally, a carbon heating apparatus produces extreme temperatures due to arc discharge and Joule heating through the contact resistance between carbon particles in response to an electric current flowing into both ends of the carbon particles received in an insulator. Since the carbon fiber was invented many years ago, the carbon heating apparatus for producing heat employs carbon yarns, a plurality of twisted carbon yarns or a textile type of graphite felt cut as needed by applying electricity to both ends of the carbon heater. Also, the carbon heating element is enveloped in a glass tube filled with an inert gas, typically using a silica glass or a hard glass. However, the hard glass is not suitable to maintain continuously at extremely high temperatures. Accordingly, a carbon heater for continuously producing high temperatures, such as a semiconductor manufacturing apparatus has a construction that the carbon heater is sealed in the quartz glass to prevent oxidizing in a high temperature environment.

According to FIG. 1 which is illustrating a front view of the conventional carbon heating apparatus, it has a structure that the carbon fiber of the carbon heater (2) is sealed into a bar shaped quartz glass tube (1) and the ends of the quartz glass tube are melted and sealed for stably connecting to the outside power supply lines. In the above illustration, the graphite felt cut to a predetermined length and sectional area is used as the carbon fiber.

As shown in FIG. 2, the upper face of the carbon fiber such as the graphite felt is smoothly formed, while its rough cut of side surface has a lot of minute carbon particles exposed to the outside as shown in FIG. 3. The exposed particles are easily separated by the outside light impact. In the case of using the carbon heating apparatus for heating or cooking, despite precisely controlling and cutting the sectional area and length to derive a required resistance and a resulting power consumption, many users would typically cut the graphite felt to a desired size and shape as needed by using tools such as a knife or scissors, etc.

At this time, the minute carbon particles or the unwoven pieces produced from the graphite felt cut arc exposed at the cutting surface. If it is sealed into the quartz glass tube without treatment, the exposed carbon particles are melted inside of the quartz glass tube to produce unwanted arcs and interrupt the operating cycle when the quartz glass tube is heated. Thereby, it will be negatively impacting the thermal efficiency and durability of a lamp and the life of a machine.

On the other hand, both ends of the carbon fiber processed as above use materials such as molybdenum or nickel to make a terminal as a general method, it is processed to have the shape of a spring.

In this case, it generates several problems due to contraction strength or compression strength. In the case of connecting both ends of the carbon fiber using the spring shape of terminals, arc discharge maybe produced between the terminal and the carbon fiber materials causing contraction and expansion relative to each other, thereby causing a short therebetween or separation of the fiber itself from the terminal, increasing contact resistance therebetween and having a negative impact on durability.

SUMMARY OF THE INVENTION

The present invention is proposed to solve the problems described above. An objective of the present invention is to provide a carbon heater with smooth surfaces and a manufacturing method thereof, not having minute carbon particles or unwoven pieces remained on the outside of a graphite felt cut to a preset length and width.

Another objective of the present invention is to prevent unwanted local arcs and smooth operating cycles when the carbon heater is heated, thereby to enhance thermal efficiency and durability of the carbon heater.

Still another objective of the present invention is to improve the structure of terminal fixtures for securely attaching both ends of the carbon heater to prevent from separation due to contraction and expansion relative to each other.

The other features of the present invention will be described fully in conjunction with constructions and actions described below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Figure 1:
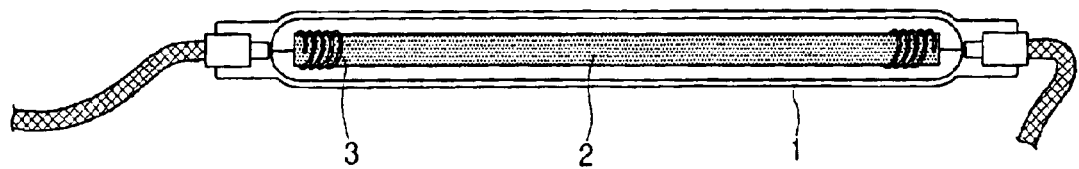
FIG. 1 is a front view showing a conventional carbon heating lamp.
Figure 2:
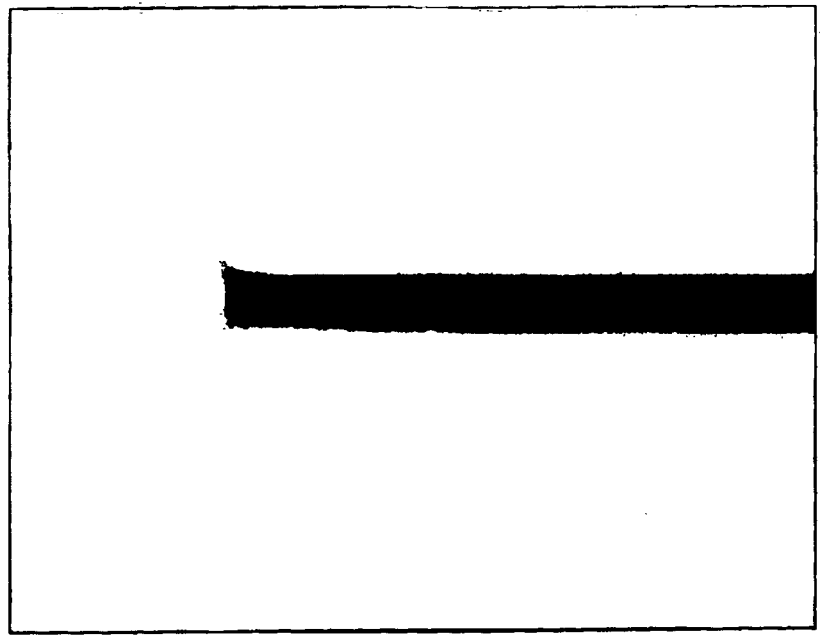
FIG. 2 is a plan view showing a plan state after cutting a carbon fiber used in the conventional carbon heating lamp.
Figure 3:
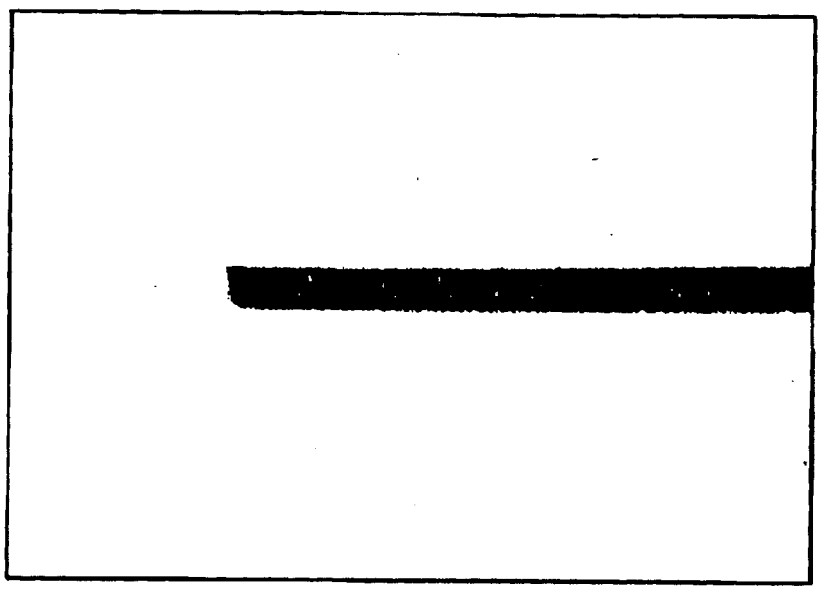
FIG. 3 is a side view showing a side surface state after cutting the carbon fiber used in the conventional carbon heating lamp.

The carbon heating apparatus of the present invention comprises: a carbon heater (20) made of carbon fiber cut having a constant form with a predetermined length and width and performing a heat treatment for the side surface cut in a hydrogen gas atmosphere under a predetermined high temperature to obtain uniform surface cut structure; a pair of terminal parts (30) connected to the outside power supply lines (40) of a predetermined material to provide an electrical connecting path to both ends of the carbon heater, the terminal parts (31) at one end for connecting to outside power supply lines by welding means and a pair of clamping brackets (32) with protrusions (33) at opposite end for securely attaching to the carbon heater; and a quartz glass tube (10) having melt-jointing portion (15) for sealing both ends of the carbon heater (20).

Preferably, the carbon heater sealed into the quartz glass tube includes a ribbon of molybdenum of a predetermined thickness and width to prevent oxidation of the carbon in case air leaks into the quartz glass tube. The ribbon of molybdenum preferably has a thickness of 28 μm to 30 μm and a width of 3 mm to 4 mm.

Also, the carbon heater can be formed preferably in a bar shape having a tetragonal cross section that one end of the terminal parts (30) is formed in a circular thin metal for circumferentially attaching the carbon heater, while the other end of the terminal parts is extended from the circular thin metal for welding with the outside power supply lines.

Since the carbon heater uses mineral carbon materials such as coke or coal to be capable of outputting about 800 watts, it can be constructed to withstand high temperatures. Also, the method of manufacturing the carbon heating device according to the present invention comprises the steps of: forming a carbon heater by cutting a predetermined carbon fiber in a constant form to have a predetermined length and width; heat-treating the carbon heater cut in a hydrogen gas atmosphere of a predetermined temperature under a high vacuum to obtain uniform cutting surface; after inserting the carbon heater into a quartz glass tube and injecting the hydrogen gas, baking it at a predetermined temperature to remove impurities; primary aging the baked carbon heater by applying a primary aging voltage; secondary aging the carbon heater by applying a secondary aging voltage; and after confirming the vacuum state, sealing the quartz glass tube.

Preferably, the process for cutting the carbon fiber may includes press cutting, laser cutting, and so on to cut the side face as clearly as possible.

Also, the heat-treating process is performed for about 2 to 3 minutes in the hydrogen gas of 900° C. to 1000° C. under a high vacuum of at least $10^{-5}$ Torr, the baking process is performed at the temperature of 1600° C. to 1700° C. to remove impurities, the primary aging voltage is 60V to 70V and the secondary aging voltage is 100V.

The preferred embodiments of the present invention will be described fully with reference to the accompanying drawings.

In the following description of the preferred embodiments, the well-known functions or constitutions are omitted so as not to obscure the subject matters of the present invention with unnecessary detail. The terms described below are established taking into account the functions of the present invention. Since the terms may be changed in accordance with manufacturer's intention or practice, the meanings of the terms should be defined based on the whole contents of the specification.

Figure 4:
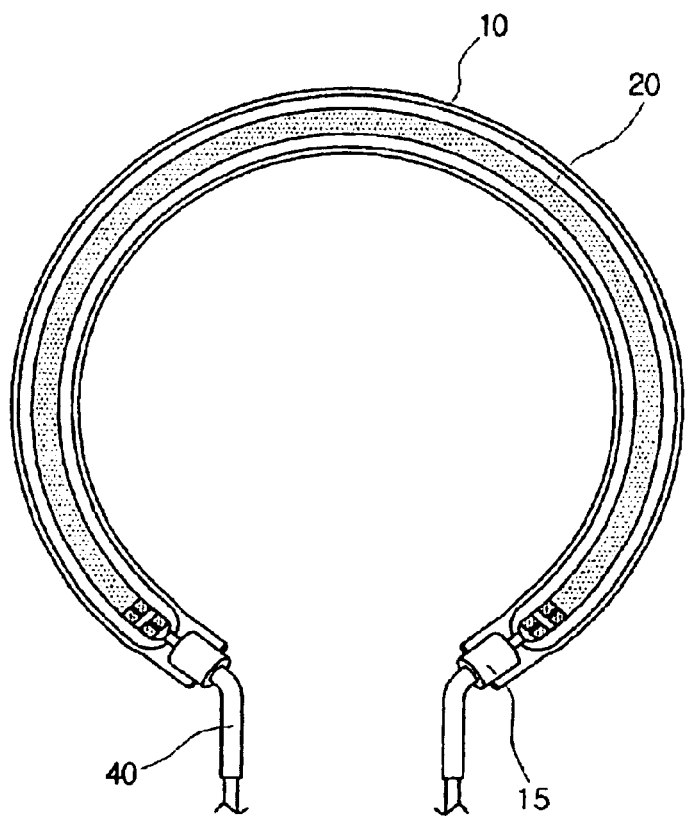
FIG. 4 is a front view showing a carbon heating apparatus according to the present invention.
Figure 5:
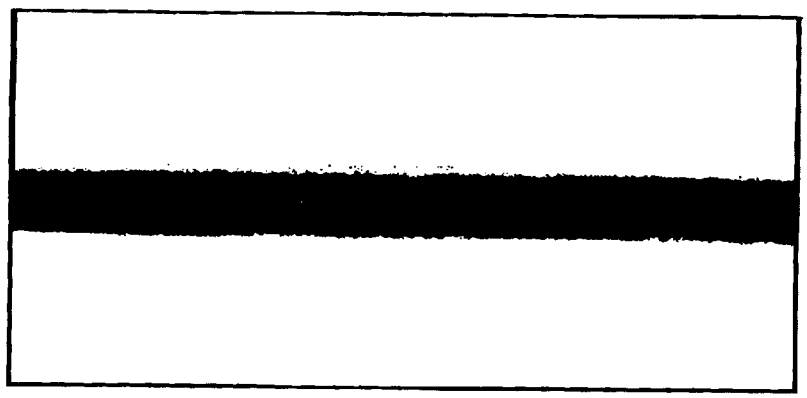
FIG. 5 is a partially enlarged perspective view showing a plan state and side surface state of the preferred carbon heater according to the present invention.

FIG. 4 is a front view showing a carbon heating apparatus according to the present invention, and FIG. 5 is a partially enlarged photograph showing the side surface of a preferred carbon heater according to the present invention.

Referring to FIG. 4, a quartz glass tube (10) uses either a quartz glass made by melting crystal, a quartz glass made from a high purity of $SiCl_4$, $SiH_4$, and so on as a starting ingredient, a quartz glass made by melting silica, or a quartz glass made from silica glass as an ingredient.

In the case of using quartz glass made from silica glass as an ingredient, it is typical to make a film layer of the quartz glass by a method including the steps of: molding the silica glass at about 550° C. to 620° C.; dividing into $B_2O_3$—$Na_2O$ phase and $SiO_2$ phase; performing an acid treatment with hydrochloric acid or the like; and performing a heat treatment process at about 1000° C. to 1200° C. Other methods are also available.

Also, the quartz glass tube (10) of the present invention uses the purity 99.5% of $SiO_2$ and a working point of 1700° C., as represented in Table 1.

TABLE 1

| No | Ingredient | Coefficient of Thermal Expansion | Specific gravity | Stress point ° C. | Annealing point ° C. | Softening point ° C. | Working Point ° C. |
|---|---|---|---|---|---|---|---|
| 1 | 99.5% of $SiO_2$ | 5.5 | 2.2 | 956 | 1084 | 1580 | 1700 |
| 2 | Corning 1742 | 45 | | 745 | 820 | 1015 | 1300 |
| 3 | GE 180 | 44 | 2.64 | 674 | 726 | 928 | 1200 |

Also, the quartz glass tube (10) typically has a thickness of about 0.04 mm to 3 mm on average to obtain sufficient mechanical strength.

The most characteristic portion of the present invention is the carbon heater (20) sealed into the quartz glass tube (10), wherein the carbon heater (20) is formed by cutting the graphite felt known as a carbon fiber to a desired length and a predetermined width as required by the desired resistance value.

The graphite felt used in the present invention is manufactured using mineral carbon materials such as coke or coal, etc. Since it is possible for mineral carbon materials to output far more heat than vegetable carbon materials, it is advantageous that the graphite felt can withstand high temperatures and can be designed to be compatible with any rated voltages in the range of 100V to 220V.

The method for cutting the graphite felt may include a press cutting method, a dedicated jig or a wire cutting method that, to the extent possible, does not produce carbon particles or unwoven pieces on the cut surface.

The amount that the carbon particles or unwoven pieces are exposed to the outside is sharply reduced in the side surface of the carbon heater (20) that is cut by press cutting, the dedicated jig or wire cutting, in comparison with the method using scissors or a knife of the prior art. However, comparing to the smoothly formed upper surface of the carbon heater (20), the section structure of the side surface is relatively rough. For this reason, the side surface cut is heat-treated for about 2 to 3 minutes in a hydrogen atmosphere of 900° C. to 1000° C. to change its physical properties, thereby to form a side surface that is just as smooth as the surface of the upper surface.

The carbon heater (20) is heat-treated before it is sealed into the quartz glass tube (10), thereby making its side surface smooth as well as removing impurities remaining in its side surface. As a result, no impurities are present upon inserting the heat-treated carbon heater (20) into the quartz glass tube (10).

A terminal part (30) is constituted to connect the carbon heater (20) to the outside power supply line (40) for providing an electrical path and a mechanical connection. The terminal parts (30) preferably consists of metal materials such as molybdenum or nickel, wherein it may take various embodiments according to the invention as shown in FIG. 6A to FIG. 10. In FIG. 4, the terminal parts (30) are in the form of the first embodiment illustrated more fully in FIG. 6A to FIG. 7B.

Figure 6A:
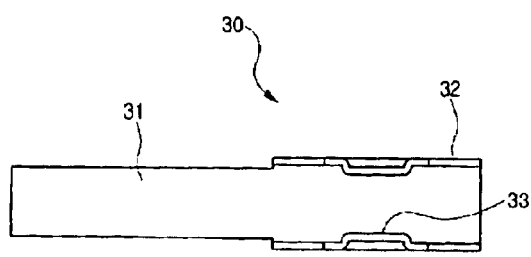
FIG. 6a is a plan view showing the first embodiment of terminal parts according to the present invention.
Figure 6B:
FIG. 6b is a side view showing the first embodiment of the terminal parts according to the present invention.
Figure 6C:
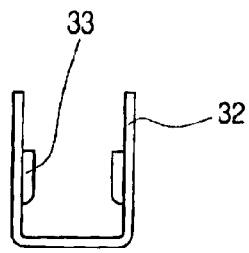
FIG. 6c is a front view showing the first embodiment of the terminal parts according to the present invention.

According to FIG. 6A to FIG. 6C, one end of a terminal parts forms a flat plate (31) for connecting to the outside power supply line (40), while other the end of a terminal parts forms a pair of clamping brackets (32) for circumferentially wrapping the carbon heater. Thus, the ends of the carbon heater (20) are securely fixed to the inside of the clamping brackets (32).

The clamping brackets (32) are further provided with a pair of protrusions (33) that can firmly clasp the carbon heater (20) to secure it at the inside and prevent it from separation easily.

Figure 7A:
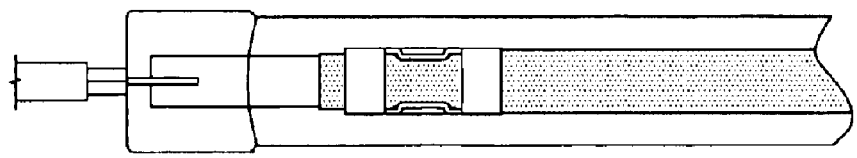
FIG. 7a is a partially enlarged plan view showing the first embodiment of the terminal parts according to the present invention.
Figure 7B:
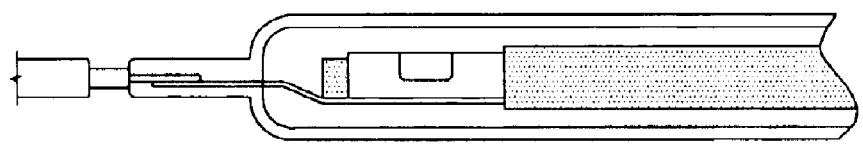
FIG. 7b is a partially enlarged front view showing the first embodiment of the terminal parts according to the present invention.
Figure 8A:
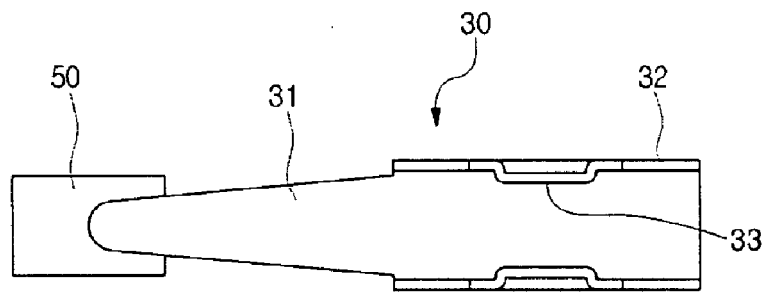
FIG. 8a is a plan view showing the second embodiment of the terminal parts according to the present invention.
Figure 8B:
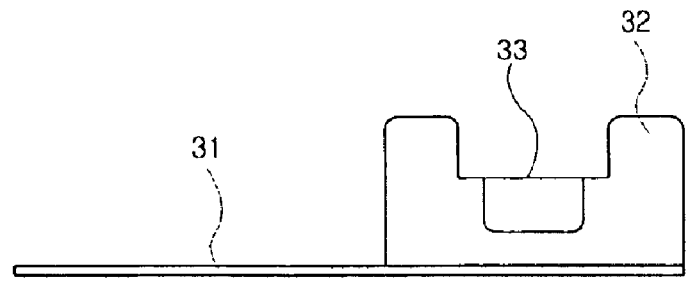
FIG. 8b is a side view showing the second embodiment of the terminal parts according to the present invention.
Figure 8C:
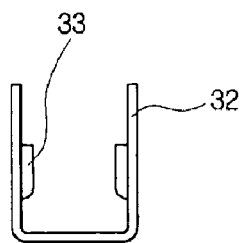
FIG. 8c is a front view showing the second embodiment of terminal parts according to the present invention.
Figure 9A:
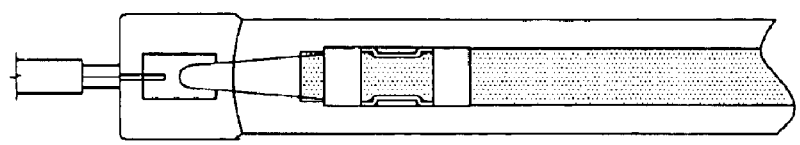
FIG. 9a is a partially enlarged plan view showing the second embodiment of the terminal parts according to the present invention.
Figure 9B:
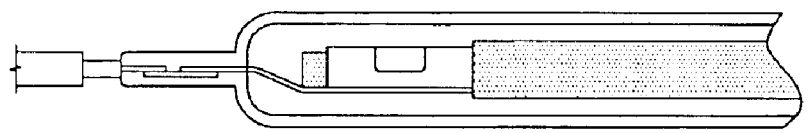
FIG. 9b is a partially enlarged side view showing the second embodiment of the terminal parts according to the present invention.
Figure 10A:
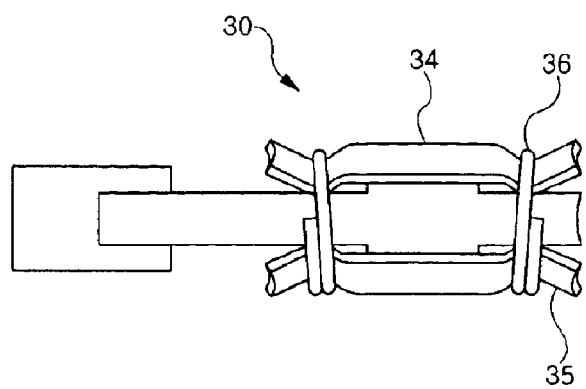
FIG. 10a is a plan view showing the third embodiment of the terminal parts according to the present invention.
Figure 10B:
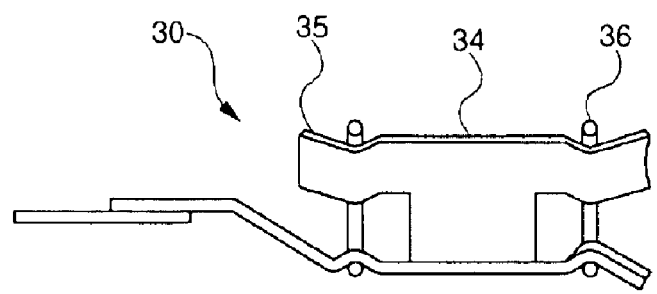
FIG. 10b is a side view showing the third embodiment of the terminal parts according to the present invention.
Figure 10C:
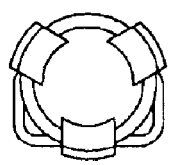
FIG. 10c is a front view showing the third embodiment of the terminal parts according to the present invention.
Figure 11A:
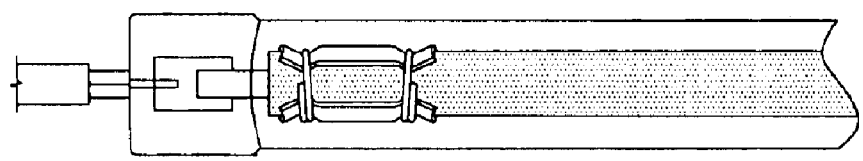
FIG. 11a is a partially enlarged plan view showing the third embodiment of the terminal parts according to the present invention.
Figure 11B:
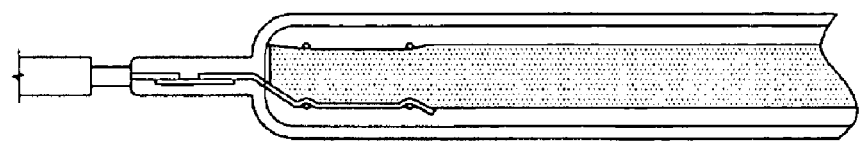
FIG. 11b is a partially enlarged side view showing the third embodiment of the terminal parts according to the present invention.

FIG. 7A and FIG. 7B are partially enlarged views showing the terminal parts (30) according to the first embodiment. This configuration of the attachment between the terminal parts (30) and the carbon heater (20) will not discharge unwanted arcs or sparks.

Accordingly, incidents such as a short caused by contraction and expansion relative to each other or the separation of the carbon fiber itself from the terminal parts are not occurred. The contact surface is much wider than that of a conventional spring form terminals for reducing contact resistance and enhancing durability.

As shown in FIG. 8 to FIG. 11B, another type of the terminal parts (30) are presented according to the second and third embodiments of the present invention. FIG. 8A to FIG. 9B show a connection member (50) between the terminal parts (30) and the outside power supply line (40). As shown in FIG. 10a to FIG. 11b, another configuration of the terminal parts for surrounding the carbon heater forms at least two circular thin metal parts (34) with bent up and down shape (35) so that a pair of clamping bands (36) can be installed at both end sides to prevent the carbon heater from loosening off.

Although the conventional spring terminals (3) adopts about 5 mm, the spring for the clamping bands (36) of the present invention adopts 8 mm to 10 mm that is significantly enhanced the durability.

Figure 12:
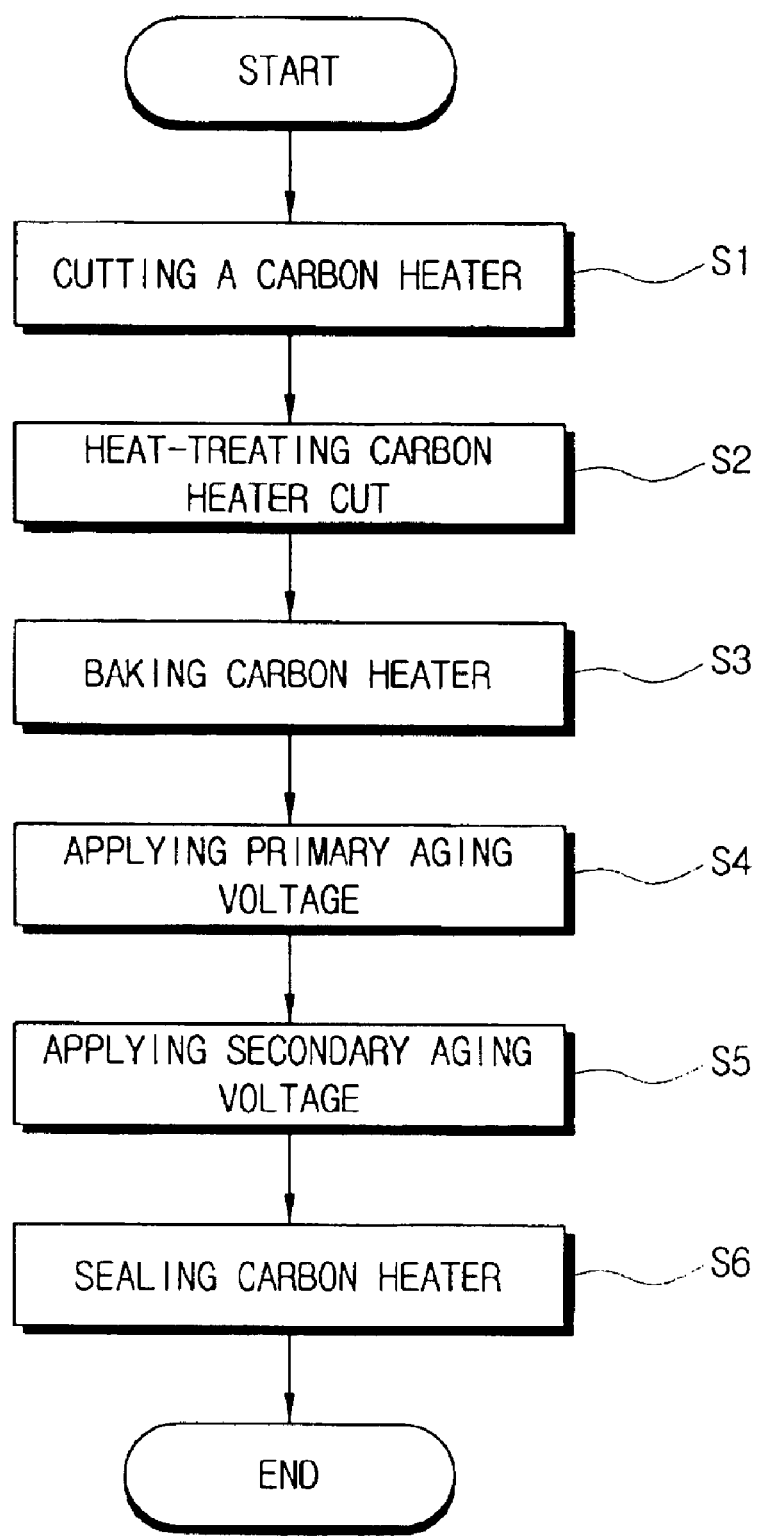
FIG. 12 is a flow chart showing a preferred method of manufacturing the carbon heating device according to the present invention.

FIG. 12 is a flow chart showing a preferred method of manufacturing the carbon heating device according to the present invention.

The method according to FIG. 12 includes the steps of: forming the carbon heater by cutting the carbon fiber such as a graphite felt into a constant form to have a predetermined length and width (step S1), wherein the length and width of the carbon heater is defined considering a desired resistance value, density and the cutting method uses press cutting or laser cutting, etc.; heat-treating the carbon heater cut in step S1 for about 2 to 3 minutes in a hydrogen gas atmosphere of 900° C. to 1000° C. under a high vacuum of at least $10^{-5}$ Torr to obtain uniform cutting surface (step S2); after inserting the heat-treated carbon heater into a quartz glass and injecting the hydrogen gas, baking it at predetermined temperature of 1600° C. to 1700° C. to remove impurities (step S3); primary aging the baked carbon heater in the step S3 by applying a primary aging voltage (step S4); secondary aging the carbon heater that has undergone the primary aging by applying a secondary aging voltage (step S5); and sealing the inside of the quartz glass tube into which the carbon heater is sealed, after confirming a vacuum state, once the secondary aging is completed in the step S5 (step S6). When the quartz glass tube is sealed by melting and molding, a LPG $O_2$ burner would typically be used, but the present invention uses a high temperature hydrogen burner of 1500° C. to 1700° C. to mold it in as short a time as possible while minimizing the effect on the carbon materials.

Assuming that the carbon heating apparatus is manufactured according to the present method, the cut side surface of the carbon heater is heat-treated in step S2 to make its surface properties uniform and at the same time to remove impurities, the carbon heater becomes stable through the aging processes of steps S4 and S5, and the quartz glass tube is fused in the shortest possible time using the hydrogen burner of a high temperature in step S6 to prevent stress from being exerted on the carbon materials.

Also, the other heat-treating method according to the present invention includes the steps of: heat-treating the cut carbon heater for about 2 hours under a high temperature of 300° C. in a process corresponding to step S2, and then slowly cooling it for 1 hour to make the section structure of the side surface thereof stable; and inserting it into the quartz glass tube and performing the baking and aging processes through steps S3, S4 and S5.

After the vacuum process for the quartz glass tube is completed, dibromoethane of the mixed gas of methylene 0.25% and bromide 70% is injected into the tube and then both inlets are sealed. After this, the carbon heater which has undergone the aging is heat-treated for about 2 hours under a high temperature of 300° C.

Although the preferred embodiments of the present invention have been disclosed as describe above, those skilled in the art will appreciate that various modifications and changes are possible, without departing from the scope and spirit of the invention. The technical protective range will be defined by the accompanying claims.

The invention can provide a carbon heater with smooth surfaces not having minute carbon particles or unwoven pieces capable of remaining in the outside of a graphite felt that has been cut to a predetermined length and width to make a carbon heater using a carbon fiber such as the graphite felt. Thus it will prevent unwanted arc and allowing smooth operating cycle when the carbon heater is heated, thereby enhancing the thermal efficiency and durability of the carbon heater. Comparing with the conventional carbon heater, the present carbon heater does not occur unwanted arcs due to the heat-treatment to remove the minute carbon particles or the unwoven pieces remaining at the cutting surface.

Also, the present invention improves the structure of terminal fixture to securely bond both ends of the carbon heater to prevent separation due to the contraction and expansion relative to each other, thereby preventing arcing between the terminal and the heater.

Further, the present invention can manufacture a carbon lamp which can output at least 800 W of power and which can be used even in voltage of at least 220V, wherein the lamp is widely applied to various industrial products such as a fish roasting appliance, a kitchen appliance, an electric stove, a duplicator, an electric heat remedy appliance, etc.

What is claimed is:

1. A carbon heating apparatus comprises:
    a carbon heater (20) made of carbon fiber cut having a constant form with a preset length and width, said carbon heater performed heat treatment in a hydrogen gas atmosphere under a predetermined high temperature to make uniform cut surface structure,
    a pair of terminal parts (30) for providing electrical connection to said carbon heater, said terminal parts having a flat portion (31) at one end for connecting to outside power supply lines by welding means and a pair of clamping brackets (32) with protrusions (33) at opposite end for securely attaching to the carbon heater.
    a quartz glass tube having a hollow cylindrical portion for enveloping said carbon heater and melt-jointing potion for sealing both ends of said carbon heater.

2. The carbon heating apparatus according to claim 1, wherein said carbon heater adopts mineral carbon materials.

3. The carbon heating apparatus according to claim 1, wherein said one end of the terminal parts forms metal plates of circular wrapping (34) with bent down and up shape (35) and a pair of clamping bands (36) for clamping the carbon heater, while opposite end of the terminal parts is extended to weld with the outside power supply lines.

4. The carbon heating apparatus according to claim 1, wherein said carbon heater is inserted and sealed inside the quartz glass tube filled with an inert gas for preventing oxidation, said quartz glass tube having either longitudinal or circular shape.

5. The carbon heating apparatus according to claim 1, wherein said terminal parts is consisted of molybdenum with a predetermined thickness and width.

6. The carbon heating apparatus according to claim 5, wherein said terminal parts has a thickness of 28 $\mu$m to 30 $\mu$m and a width of 3 mm to 4 mm.

7. A method of manufacturing a carbon heating device comprises the steps of:
    forming a carbon heater by cutting a predetermined carbon fiber in a constant form to have a predetermined length and width,
    heat-treating the carbon heater cut in a hydrogen gas atmosphere under a preset high temperature and vacuum to have uniform cutting surface,
    after inserting the heat-treated carbon heater into a quartz glass tube and injecting the hydrogen gas, baking the carbon heater at a predetermined temperature to remove impurities,
    primary aging the baked carbon heater by applying a primary aging voltage,
    secondary aging the carbon heater by applying a secondary aging voltage, and
    after confirming vacuum state, sealing the quartz glass tube by melting and molding.

8. The method of manufacturing a carbon heating device according to claim 7, the process for cutting the carbon fiber uses either one of press cutting, dedicated jig or wire cutting means.

9. The method of manufacturing a carbon heating device according to claim 7, the heat-treating process performs about 2~3 minutes in the hydrogen gas atmosphere of 900° C. to 1000° C. under a high vacuum state of at least $10^{-5}$ Torr.

10. The method of manufacturing a carbon heating device according to claim 7, the baking process performs at the temperature of 1600° C. to 1700° C. to remove impurities.

11. The method of manufacturing a carbon heating device according to claim 7, the primary aging voltage uses 60V to 70V 12. The method of manufacturing a carbon heating device according to claim 7, the secondary voltage uses 100V.

13. The method of manufacturing a carbon heating device according to claim 7, the process for melting and molding the quartz glass tube performs at a high temperature of 1500° C. to 1700° C. by a hydrogen burner.

14. The method of manufacturing a carbon heating device according to claim 7, the heat-treating process performs heat-treating the carbon heater cut for about 2 hours under a high temperature of 300° C. and slowly cooling for 1 hour to obtain a stable section structure on cutting side surface.

15. The method of manufacturing a carbon heating device according to claim 7, the sealing process performs injecting and sealing a mixed gas of methylene 0.25% and bromide 70% into the quartz glass tube.

* * * * *